United States Patent
Chen et al.

(10) Patent No.: US 8,746,723 B2
(45) Date of Patent: Jun. 10, 2014

(54) SPARKING DEVICE FOR A PERSONAL MOBILITY VEHICLE

(75) Inventors: Robert Chen, San Marino, CA (US); Seth Calvin, San Marino, CA (US); William Griggs, Anaheim, CA (US)

(73) Assignee: Razor USA, LLC, Cerritos, CA (US)

( * ) Notice: Subject to any disclaimer, the term of this patent is extended or adjusted under 35 U.S.C. 154(b) by 57 days.

(21) Appl. No.: 13/440,761

(22) Filed: Apr. 5, 2012

(65) Prior Publication Data

US 2012/0256389 A1 Oct. 11, 2012

Related U.S. Application Data

(60) Provisional application No. 61/473,663, filed on Apr. 8, 2011.

(51) Int. Cl.
*B62M 1/00* (2010.01)

(52) U.S. Cl.
USPC .............................. 280/288.4; 280/259; 188/5

(58) Field of Classification Search
USPC ................................ 280/259, 288.4; 188/5, 6
See application file for complete search history.

(56) References Cited

U.S. PATENT DOCUMENTS

| | | | |
|---|---|---|---|
| 2,205,713 A | 4/1939 | Cain | |
| 2,389,198 A | 11/1945 | Kent | |
| 3,086,788 A | 4/1963 | Vislocky | |
| 3,206,223 A * | 9/1965 | Frye | 280/274 |
| 3,429,584 A * | 2/1969 | Hendricks | 280/261 |
| 4,045,046 A | 8/1977 | Taylor et al. | |
| 4,286,806 A | 9/1981 | Bergstein | |
| 4,394,037 A | 7/1983 | Kuntz | |
| 4,466,630 A | 8/1984 | Larkin | |
| 4,834,407 A | 5/1989 | Salvo | |
| 5,048,897 A | 9/1991 | Yeh | |
| 5,323,869 A | 6/1994 | Kurayoshi et al. | |
| 5,391,102 A | 2/1995 | Bosch | |
| 5,460,390 A | 10/1995 | Miller | |
| 5,523,925 A | 6/1996 | Bare, IV | |

(Continued)

FOREIGN PATENT DOCUMENTS

| | | |
|---|---|---|
| CA | 2 433 064 A1 | 10/2004 |
| CN | 201 338 697 Y | 12/2008 |

(Continued)

OTHER PUBLICATIONS

European Search Report for Application No. 09-170614.3 mailed Sep. 21, 2010 in 7 pages.

(Continued)

*Primary Examiner* — Kevin Hurley
*Assistant Examiner* — Michael Stabley
(74) *Attorney, Agent, or Firm* — Knobbe, Martens, Olson & Bear, LLP

(57) ABSTRACT

A spark generating device that is supported by a tricycle is movable to a position in which the spark generating device contacts the riding surface. The spark generating device includes a handle actuation portion and a spark portion that creates sparks on the riding surface as a result of frictional contact with the riding surface. The spark generating device can also include a handle actuation portion which is accessible to the user and allows the user to move the spark generating device to the second position without having to manipulate the wheels or pedals of the tricycle.

17 Claims, 6 Drawing Sheets

(56) References Cited

U.S. PATENT DOCUMENTS

| | | | |
|---|---|---|---|
| 5,895,072 A | 4/1999 | Coroneos et al. | |
| 5,921,653 A | 7/1999 | Chien | |
| 6,059,315 A | 5/2000 | Selph | |
| 6,378,879 B2 * | 4/2002 | Rappaport | 280/87.041 |
| 6,821,181 B1 | 11/2004 | Domingues | |
| 6,961,531 B2 | 11/2005 | Hoobing | |
| 7,007,977 B1 | 3/2006 | Gallagher | |
| D606,610 S | 12/2009 | Sramek et al. | |
| 7,862,055 B2 | 1/2011 | Bennett | |
| 8,146,947 B2 | 4/2012 | Hadley | |
| 2003/0151214 A1 | 8/2003 | Chen | |
| 2004/0000768 A1 | 1/2004 | Miller | |
| 2004/0021283 A1 | 2/2004 | Serling | |
| 2004/0076453 A1 | 4/2004 | Hoobing | |
| 2005/0127630 A1 | 6/2005 | Kuhlman | |
| 2010/0096824 A1 | 4/2010 | Hadley | |
| 2010/0171280 A1 | 7/2010 | Hadley | |
| 2011/0121551 A1 | 5/2011 | Hadley et al. | |

FOREIGN PATENT DOCUMENTS

| | | |
|---|---|---|
| DE | 202 06 300 | 10/2002 |
| DE | 101 47 258 A1 | 4/2003 |
| DE | 10 2005 003027 B3 | 2/2006 |
| EP | 1867368 A2 | 12/2007 |
| EP | 2 179 913 | 4/2010 |
| FR | 2 753 634 A1 | 3/1998 |
| GB | 2 363 175 A | 12/2001 |
| WO | WO 02/44007 A1 | 6/2002 |

OTHER PUBLICATIONS

International Search Report and Written Opinion for Application No. PCT/US2010/039086 mailed Jun. 17, 2010 in 16 pages.

* cited by examiner

SPARKING DEVICE FOR A PERSONAL MOBILITY VEHICLE

PRIORITY INFORMATION

The present application claims benefit under 35 U.S.C. §119(e) to U.S. Provisional Patent Application No. 61/473,663, filed Apr. 8, 2011, entitled "SPARK GENERATING DEVICE FOR A TRICYCLE," the entire contents of which is hereby expressly incorporated by reference.

BACKGROUND OF THE DISCLOSURE

1. Field of the Invention

Embodiments of the invention relate generally to personal mobility vehicles and, more specifically, to a tricycle with a spark generating device.

2. Description of the Related Art

Three-wheeled vehicles, commonly known as tricycles comprise a front wheel and a pair of spaced rear wheels, and many types and styles of tricycles have been developed for use by both children and adults. Riding on tricycles is a popular recreational activity. This is especially true for younger age children who do not yet have the physical coordination and skill necessary to ride more advanced recreational vehicles such as two-wheeled bicycles, skateboards, roller skates, or two-wheeled scooters. There have been many tricycles devised over the years. Most of these tricycles perform the normal function of moving when pedaled by the user and turning on a radius determined by manipulation of the handlebars controlling the front wheel. There have been very few tricycle designs which add accessories to add excitement and desirability to the standard design.

Spark generation is one feature that has been added to several recreational apparatus and activities. Many of these apparatus and activities have integrated spark generators into their designs and configurations. Skateboards, roller skates, and roller blades have been designed to allow the user to generate sparks while performing the corresponding activity. Some of these prior art arrangements attach a spark generating material in a fixed manner to the apparatus which generates sparks upon contacting the riding surface. This requires that the entire apparatus be adjusted or displaced in order to generate sparks. For example, with roller blades and skateboards, the user would have to lift the front wheels off of the contact surface in order to cause the spark material to engage the riding surface to generate sparks.

With a tricycle, it would be very difficult and undesirable to lift any portion of the tricycle off of the riding surface in order to generate sparks. Other prior art arrangements, for example those on skateboards or scooters, require the user to adjust or act upon a spark generating portion with the user's foot or feet. However with a tricycle, it is desirable to allow the user to generate sparks without the use of the user's foot or feet, as typically tricycle configurations require users to act upon the pedals with both feet to propel the tricycle forward. Therefore, the current arrangements in the prior art for generating sparks on recreational items are unsuitable for use with tricycles.

SUMMARY OF THE DISCLOSURE

Preferred embodiments of the present vehicle are configured to allow a user to generate sparks without having to move ones feet or change position on the vehicle. A user can produce sparks while at the same time maintaining contact between the wheels and the riding surface. Furthermore, preferred embodiments allow the user to conveniently activate a spark assembly with his or her hand without removing his or her feet from pedals or other portions of the vehicle. Furthermore, preferred embodiments are configured so that the spark assembly is located proximate the hand of a user so that the user is not required to move his or her hand a large distance to order to activate the spark assembly.

A preferred embodiment is a vehicle configured to generate sparks and including a frame. The frame supports a spark generating assembly and the spark actuation assembly includes a handle actuation portion and a spark portion. The spark portion is configured to emit sparks when in frictional contact with the riding surface.

Another preferred embodiment is a vehicle comprising a frame having a front portion and rear portion and a handlebar assembly rotatably connected to the front portion of the frame. A front wheel is coupled to the handlebar assembly and foot pedals are operably connected to the front wheel. The vehicle includes a seat supported by the frame and rear wheels supported by the rear portion of the frame. The vehicle also includes a spark generating assembly comprising an attachment portion configured to be rotatably supported by the frame and a handle actuation portion that is accessible to a hand of a user. The spark generating assembly includes a spark portion that is movable with respect to the frame, the spark portion including at least one spark element that generates sparks when in frictional contact with a surface. Preferably, the spark portion has a first position in which the spark portion is not in contact with a surface and a second position in which the spark portion is in contact with a surface. The spark portion is biased toward the first position by a biasing member and the spark portion is movable to the second position in response to the user acting upon the handle actuation portion.

In a preferred embodiment, the attachment portion is coupled to the frame at a location beneath the seat. In another embodiment, the handle actuation portion extends upward from a location lower than the seat to a location higher than at least a portion of the seat. Preferably, the handle actuation portion and the spark portion are on opposite sides of the seat.

In a preferred embodiment, the rear wheels are configured to swivel relative to the frame. Preferably, the spark portion moves downward as the actuation portion moves upward or backward. In one embodiment, the spark element contacts the riding surface at a location forward of the rear wheels when the spark portion is in the second position. In another preferred embodiment, the handle actuation portion is supported by the handlebar assembly.

Another preferred embodiment is a vehicle comprising a frame having a front portion and a rear portion. The frame supports a seat and a handlebar assembly is rotatably coupled to the frame. The vehicle has a first side and a second side defined by a center line, the center line extends between the front portion and the rear portion and through the center of the vehicle. The vehicle includes a front wheel operatively coupled to the handlebar assembly and a spark generating assembly comprising an attachment portion configured to be supported by the frame. The spark generating assembly includes a handle actuation portion accessible to the hand of a user and a spark portion that generates sparks when in frictional contact with a surface. The spark portion has an engaged position in which the spark portion is in contact with a surface and the spark portion is movable to the engaged position in response to the user acting upon the handle actuation portion. The spark portion and the handle actuation portion are located on opposite sides of the center line.

Preferably, the attachment portion is rotatably coupled to the frame at a location beneath the seat. In one embodiment, the handle actuation portion is located adjacent to the seat and to the side of the seat. The spark portion can include a plurality of spark elements configured to generate sparks when in frictional contact with a surface.

Another preferred embodiment is a spark generating device for a vehicle, the vehicle having a frame supporting a seat and a handlebar assembly. The spark generating device comprises an attachment portion configured to be rotatably supported by a vehicle, the attachment portion including an axis and at least a portion of the spark generating device being rotatable about the axis. The spark generating device also includes a handle actuation member that is accessible to the hand of a user and a spark portion having a spark element that generates sparks when in contact with a riding surface. Preferably, the spark portion is lower than the handle actuation member and closer to the riding surface. Preferably, the spark portion has a first position in which the spark element is not in contact with the riding surface and a second position in which the spark element is in contact with the riding surface. The spark portion is biased toward the first position by a biasing member and the spark portion is movable to the second position in response to the user acting upon the handle actuation portion.

Preferably, the attachment portion is rotatably coupled to the frame at a location beneath the vehicle. In one embodiment, upward or backward movement of the handle actuation portion causes the spark portion to move downward. Preferably, the handle actuation portion extends in a first direction and is coupled to a part of the attachment portion that extends in a second direction, the first direction being substantially perpendicular to the second direction.

Preferred embodiments also include methods of using and methods of manufacturing the vehicles described above. One preferred embodiment is a method of creating sparks using a vehicle having a frame, a front wheel, a rear wheel and a seat. The frame is rotatably supporting a spark generating assembly and the spark generating assembly comprises a hand actuator portion, and attachment portion and a spark portion. The method comprises propelling the vehicle along a surface so that the front wheel and the rear wheel roll along the surface. While the vehicle is moving along the surface, the method includes moving the hand actuator portion of the spark assembly to rotate the spark generating assembly relative to frame of the vehicle so that the spark portion contacts the surface to create sparks. Preferably, moving the hand actuation portion upward or backward causes the spark portion to move downward toward the surface.

Furthermore, it is an object of one or more of the present invention to provide a combination of spark generation with a new and improved tricycle providing a unique turning action and alternate range of motion compared to conventional tricycles.

BRIEF DESCRIPTION OF THE DRAWINGS

These and other features, aspects, and advantages of the present invention are described below with reference to illustrations of a preferred embodiment, which is intended to illustrate, but not to limit, the present invention.

DETAILED DESCRIPTION OF THE PREFERRED EMBODIMENTS

Figure 1:
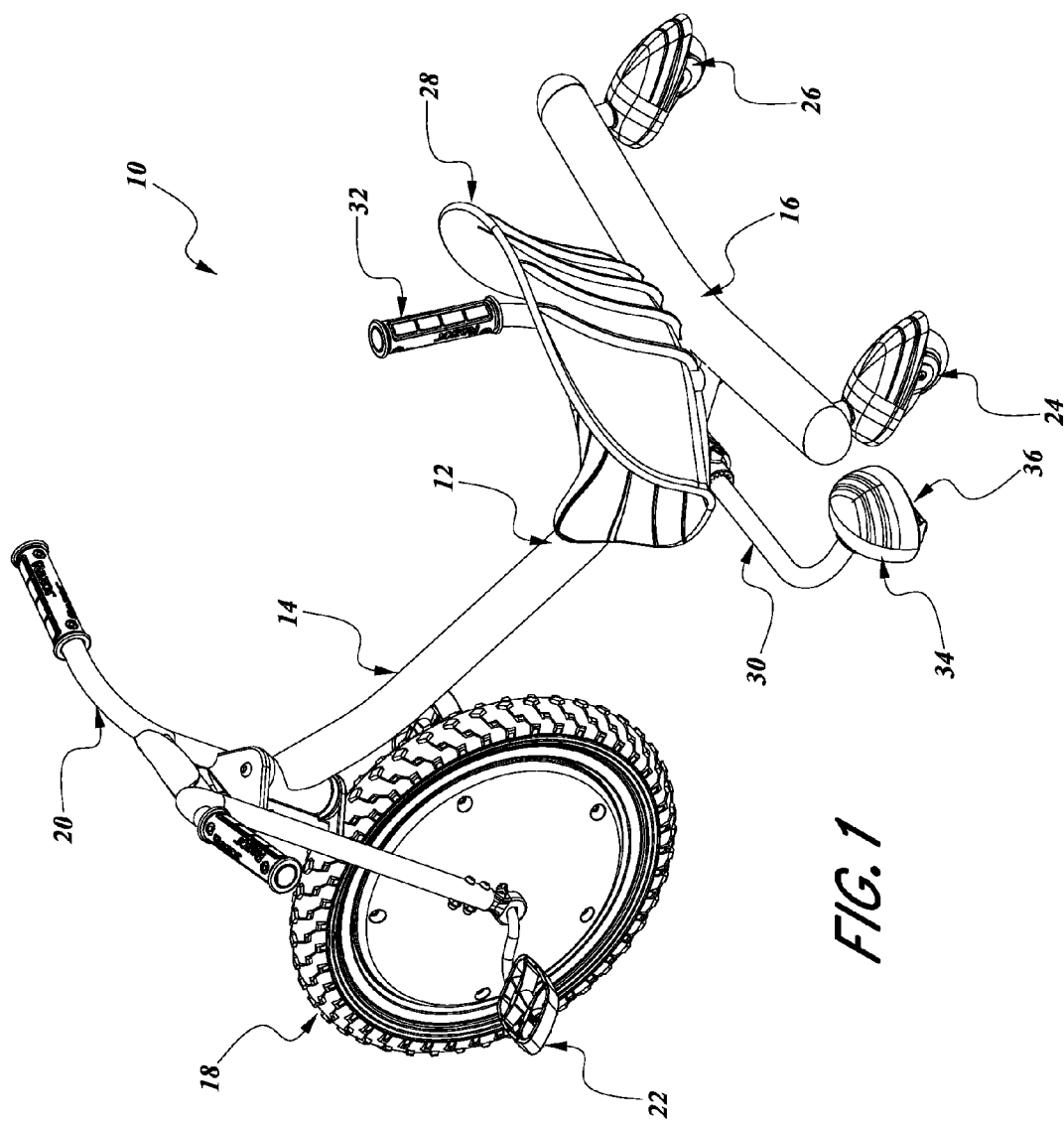
FIG. 1 is an illustration of a tricycle incorporating an embodiment of the spark generating device having certain features, aspects and advantages of the present invention.

In the following detailed description, terms of orientation such as "top", "bottom", "upward", "downward", "lower", "front", "frontward", "rear", "rearward", and "end" are used to simplify the description of the context of the illustrated embodiments. Likewise, terms of sequence, such as "first" and "second", are used to simplify the description of the illustrated embodiments. However, other orientation and sequences are possible, and the present invention should not be limited to the illustrated orientation(s). Those skilled in the art will appreciate that other orientations of the various components are possible.

Preferred embodiments of the present vehicle (e.g., tricycle) are configured to allow a user to generate sparks without having to manipulate the wheels or pedals of the tricycle being ridden. A user can produce sparks while at the same time maintaining the tricycle's direction and speed. Furthermore, preferred embodiments allow the user to activate a spark assembly with one hand. Furthermore, preferred embodiments are configured so that the means to activate a spark assembly is located proximate to the seat of the user or the handlebars of the tricycle so that the user is not required to move his or her hand a large distance in order to activate the spark assembly.

For the purposes of this disclosure, the personal mobility vehicles will be referred to as "tricycles", but it will be understood by those with ordinary skill in the art that the present invention extends beyond the specifically disclosed embodiments and references to tricycles to other alternative embodiments and/or uses of the invention and obvious modifications and equivalents thereof. In particular, while the present systems and methods have been described in the context of particularly preferred embodiments as it relates to tricycles, the skilled artisan will appreciate, in view of the present disclosure, that certain advantages, features and aspects of the systems and methods may be realized in a variety of other applications, including personal mobility vehicles other than tricycles with at least one steerable front wheel and at least two rear wheels.

A preferred embodiment involves a tricycle having a spark generating assembly operably connected to the frame of said tricycle. The spark generating assembly has a handle actuation portion and at least one spark portion. The spark portion has at least one spark element which is configured to emit sparks when in frictional contact with the riding surface. The spark portion may comprise a removable spark cartridge comprising at least one spark element. The spark generating assembly has a first position in which the spark element is not in frictional contact with the riding surface. The spark generating assembly is movable by the user to a second position in which the spark element contacts the riding surface. The spark generating assembly is biased to the first position by a biasing member, and is moveable from the first position to the second position by the user by acting upon the handle actuation portion of the spark generating assembly.

A preferred embodiment involves a tricycle having a spark generating assembly operably connected to the frame of said tricycle. The spark generating assembly as described in the previous paragraph is operably connected to the frame of said tricycle. The handlebar assembly of the tricycle includes at least one actuating lever assembly operably connected proximate at least one handlebar handgrip for the user. The at least one actuating lever assembly includes an actuating hand lever, the actuating hand lever having a first position and being movable to a second position. In a preferred embodiment, the actuating hand lever is biased toward the first position by a biasing means. The actuating lever assembly is coupled to the spark generating assembly and configured such that the spark generating assembly is moved from the first position to the second position by the user acting upon the actuating hand lever to move the actuating hand lever from the first position to the second position.

In one embodiment, each of the at least two rear wheels are swivel caster wheels configured to rotate about its swivel axis. In another embodiment, each of the at least two rear wheels are swivel caster wheels configured to freely rotate through 360 degrees about its swivel axis. In still another embodiment, a biasing mechanism is operably coupled to each of the at least two rear swivel caster wheels to limit the degree of rotation of each wheel, and to return each rear wheel to its neutral steering position once the external swiveling forces have been removed.

A preferred embodiment involves a tricycle having a spark generating assembly operably connected to the frame of said tricycle. The spark generating assembly as described in the previous paragraphs is operably connected to the frame of said tricycle. The handlebar assembly of the tricycle includes at least one hand throttle assembly rotatably supported by at least one handlebar handgrip of the handlebar assembly. The at least one hand throttle assembly has a first position and is rotatably moveable by the user to a second position. The at least one hand throttle assembly is operably coupled to the spark generating assembly by a coupling means, such as a cable, and configured such that the spark generating assembly is moved from the first position to the second position by the user rotatably moving the hand throttle assembly from the first position to the second position by exerting a rotating force upon the hand throttle assembly. In a preferred embodiment, the at least one hand throttle assembly is rotatably biased toward the first position.

A preferred embodiment involves a tricycle with a spark generating assembly as described in the previous paragraphs, and in which the spark generating assembly includes a plurality of spark portions, each said spark portion including a plurality of spark elements configured to emit sparks when in frictional contact with the riding surface.

A preferred embodiment involves a tricycle with a spark generating assembly as described in the previous paragraphs, and in which the at least one spark elements of the at least one spark portion contact the riding surface at a forward point relative the rear wheels of the tricycle when the spark generating assembly is moved to the second position. Another preferred embodiment involves the same tricycle in which the at least one spark elements contact the riding surface at a rearward point relative the rear wheels of the tricycle when the spark generating assembly is moved to the second position.

A preferred embodiment involves a tricycle with a spark generating assembly as described in the previous paragraphs, and in which the means to activate the spark assembly is proximate to the right side of the seated user.

A preferred embodiment involves a tricycle with a spark generating assembly as described in the previous paragraphs, and in which the means to activate the spark assembly is proximate to the left side of the seated user.

A preferred embodiment involves a tricycle with a spark generating assembly as described in the previous paragraphs, and in which the at least one spark portion and/or the at least one spark elements of the spark generating assembly is replaceable.

A preferred embodiment involves a tricycle with a spark generating assembly as described in the previous paragraphs, and in which the at least two rear wheels are swivel caster wheels allowing the user to cause the rear portion of the tricycle to travel in a substantially different direction than the direction of the front wheel. A swivel caster wheel typically includes a wheel configured to rotate around a rotational axis and a fork supporting the wheel, which enables the wheel to swivel around a swivel axis.

Another preferred embodiment involves a tricycle with a spark generating assembly as described in the previous paragraphs, and in which an electric motor is powered by a battery providing rotational force upon the at least one front wheel.

Preferred embodiments also include methods of using the tricycles described above. Preferred embodiments further include methods of manufacturing the tricycles described above.

Referring now to FIG. 1, a preferred embodiment of the invention is illustrated showing a tricycle 10 configured to generate sparks which comprises a frame 12 having a front portion 14 and a rear portion 16; a steerable front wheel 18 attached to a handlebar assembly 20 which is rotatably connected to the front portion of the frame 14; foot pedals 22 which are operably connected to the front wheel 18; and a first rear wheel and a second rear wheel 26, the two rear wheels supported by the rear portion 16 of the frame 12. The rear wheels 26 are preferably caster type wheels that are able to swivel and change direction relative to the frame 12. This allows the user to exert a centrifugal force on the rear of the tricycle upon performing a turning action. This may cause the rear caster wheels to rotate about their respective swivel axes, causing the rear portion of the tricycle to travel in a substantially different direction than the rotational direction of the front wheel 18. In other embodiments, the rear wheels 26 are not configured to swivel and can be fixed in a single direction.

A spark generating assembly 30 is operably connected to the frame 12, the spark generating assembly 30 having a handle actuation portion 32 and a spark portion 34 with a plurality of spark elements configured to emit sparks when in frictional contact with a riding surface. As illustrated in FIG. 1, the handle actuation portion 32 and the spark portion 34 are integrally connected to comprise the spark generating assembly 30, although in some embodiments the handle actuation portion 32 and the spark portion 34 are operably connected, or operably coupled by a connecting or coupling means respectively. The spark generating assembly 30 is biased toward a first position in which the spark portion 34 does not contact the riding surface. The spark generating assembly 30 is movable to a second position in which the spark elements 36 contact the riding surface. A user can move the spark portion 34 from the first position to the second position by acting upon the handle actuation portion 32 of the spark generating assembly 30. In the embodiment as illustrated in FIG. 1, the user moves the spark generating assembly 30 from the first position to the second position by pulling the handle actuation portion 32 upward and rearward. Preferably, the spark generating assembly 30 is biased toward one position or the other by a biasing member, such as a spring or other tensioning or force exerting mechanism. In some embodiments, the spark generating assembly 30 can be fixed in the first position and/or it can also be fixed in the second position. In some embodiments, the spark generating assembly is movable to a second position in which the spark elements 36 contact the front wheel 18 or rear wheels 26 to generate sparks.

In preferred embodiments, the spark portion 34 may include a spark cartridge or assembly similar to those disclosed in U.S. patent application Ser. No. 12/256,255 (now U.S. Pat. No. 8,146,947) filed on Oct. 22, 2008, U.S. patent application Ser. No. 12/499,750 (pending) filed on Jul. 8, 2009, and U.S. patent application Ser. No. 12/818,045 (pending) filed on Jun. 17, 2010. Each of these previously filled patent applications is incorporated herein in its entirety. Preferably, the spark portion 34 includes a spark cartridge that is replaceable and can be removed from the spark portion. In a preferred embodiment, the spark cartridge includes L-shaped voids into which L-shaped portions of the spark portion can be inserted to hold the cartridge in place. The cartridge can also include one or more tabs having a protrusion. The protrusion on the tab is configured to enter a void on the spark portion when the cartridge is inserted. The protrusion and the void on the spark portion being sized and shaped so that the interaction between the protrusion and the void on the spark portion tends to hold the cartridge in place with respect to the spark portion. Preferably, the one or more tabs are movable to allow removal of the protrusion from the void on the spark portion and release of the cartridge from the spark portion. Preferably, the L-shaped portions of the spark portion include a stop portion that abuts against a surface of the cartridge when the cartridge is inserted onto the spark portion.

Figure 2:
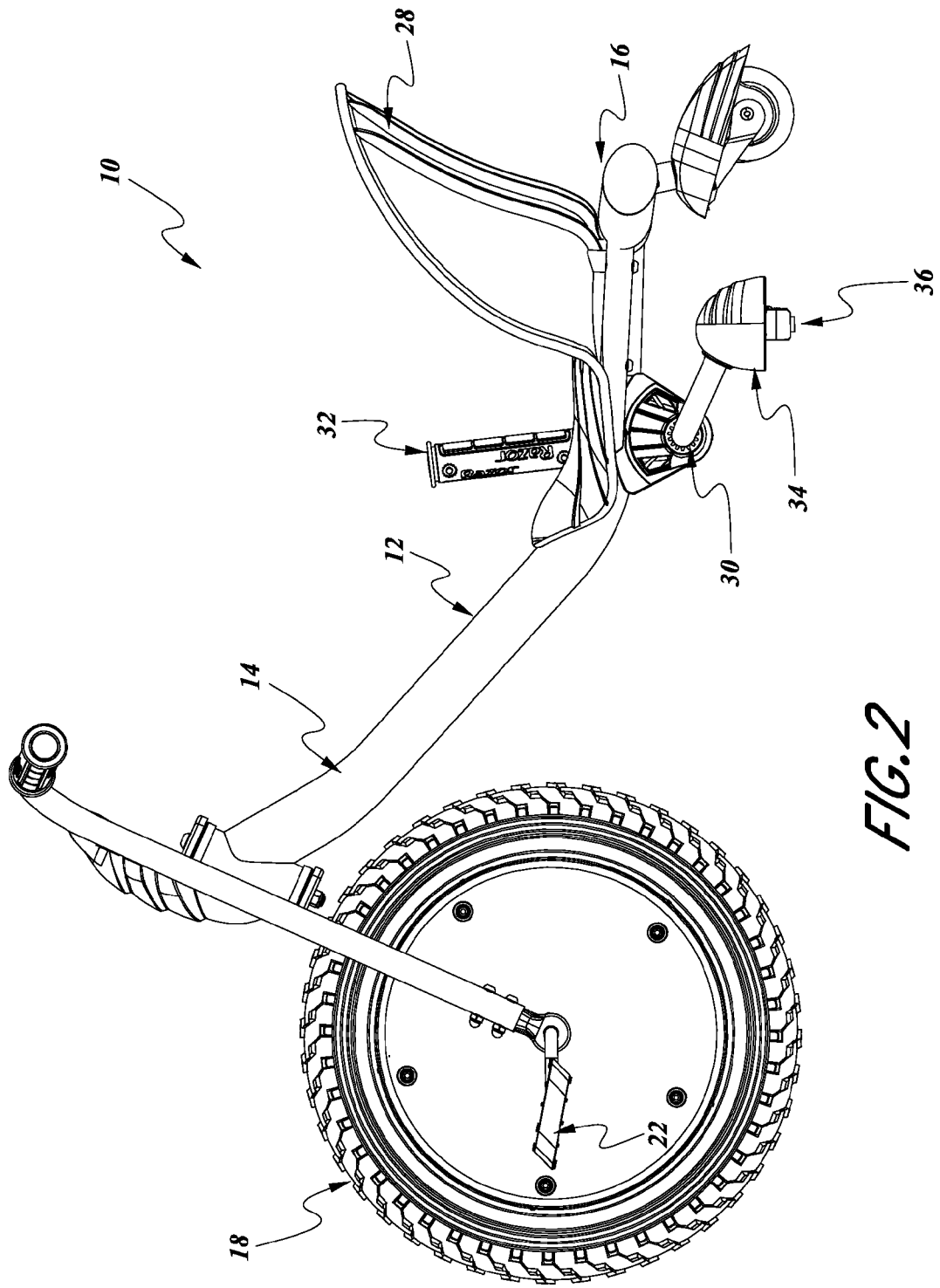
FIG. 2 is a side view of the spark generating device supported by the tricycle of FIG. 1.

FIG. 2 shows a side view of a preferred embodiment of the tricycle. The frame 12 of the tricycle 10 may also support a seat 28 for the user connected to the frame 12. In a preferred embodiment, the spark generating assembly 30 is operably connected to the front portion 14 of the frame. In another preferred embodiment, the spark generating assembly 30 is operably connected to the rear portion 16 of the frame. In another preferred embodiment, the spark generating assembly 30 is operably connected to the frame 12 at a point proximate to the point of connection between the frame 12 and the seat 28. This generally allows for a visually pleasing configuration of the tricycle 10 as the connection point between the spark generating assembly 30 and the frame may be concealed from above by the seat 28.

Figure 3:
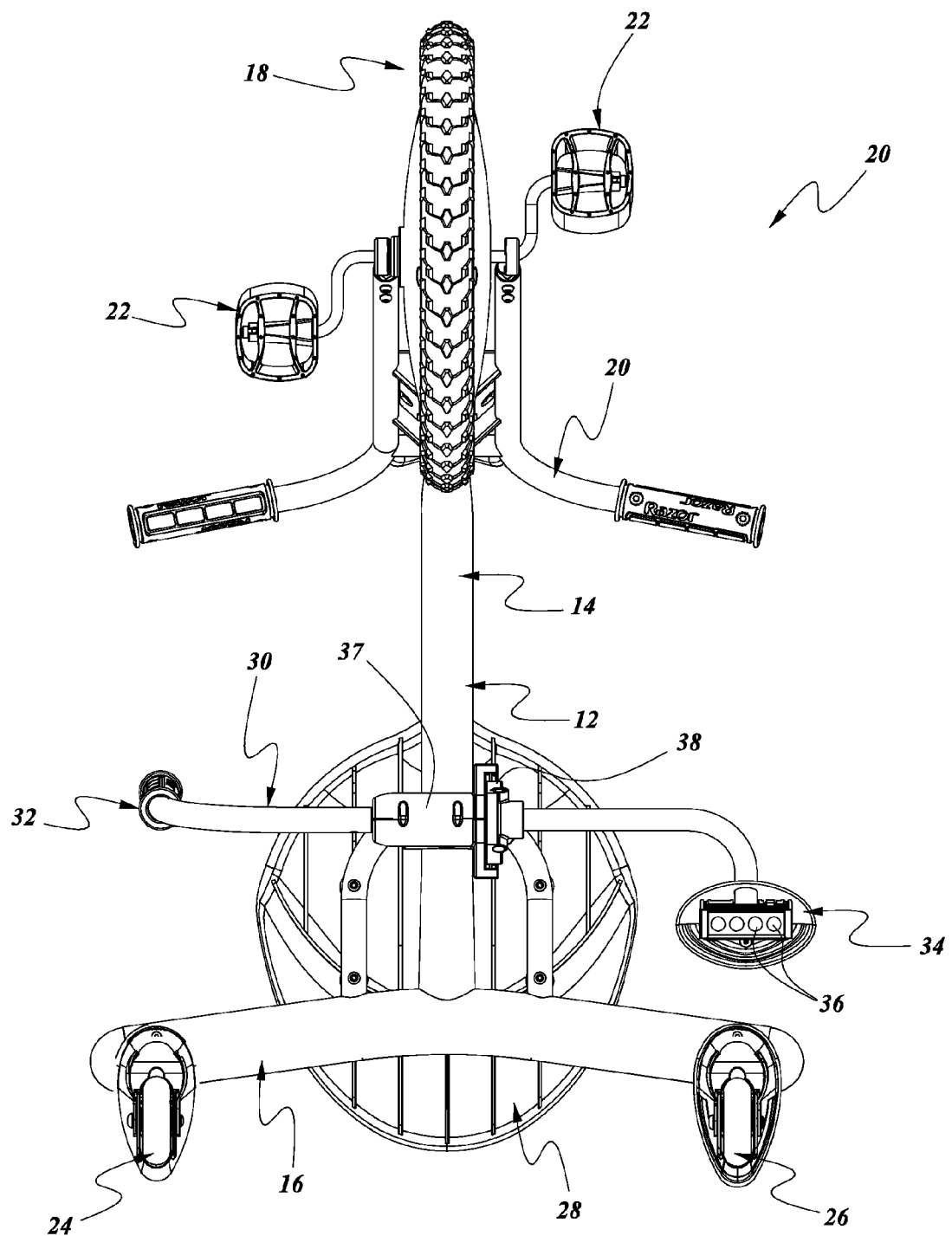
FIG. 3 is a bottom view of the spark generating device supported by the tricycle of FIG. 1.

As shown in FIG. 3, in some embodiments, the handle actuation portion 32 is positioned on one side of the center line of the tricycle 10, the front portion 14 or the seat 28 and the spark portion 34 is positioned on the opposite side of the center line of the tricycle 10, the front portion 14 or the seat 28. Moreover, a distance between the handle actuation portion 32 and an axis of rotation of the spark generation assembly 30 may be greater than a distance between the spark portion 34 and the axis of rotation to provide a mechanical advantage to the actuation of the spark generation assembly 30. The illustrated embodiments include tricycles having three wheels, but in other embodiments the spark generating assembly is supported by different types of vehicles including two-wheel vehicles and four-wheel vehicles. Other embodiments include vehicles having no wheels and vehicles having skis, tracks or sliding members that provide movement of the vehicle.

Preferably, the illustrated embodiment includes a coupling member or housing 37 that rotatably supports the spark generating assembly 30. In the illustrated embodiment, a biasing member 38 is arranged within or adjacent to the housing 37. A portion of the biasing member 38 can be fixed with respect to the housing and another portion of the biasing member 38 can be fixed with respect to the spark generating assembly 30. Preferably, this causes the spark generating assembly 30 to be biased toward a first position in which the spark portion 34 does not contact the riding surface. In preferred embodiments, the biasing member 38 can be a torsion spring or other type of spring or device. In other embodiments, the spark assembly 30 is biased toward a second position in which the spark portion 34 is in contact with the riding surface.

The at least two rear wheels 24, 26 may be swivel caster wheels which are allowed to rotate freely about their respective swivel axes. This may allow the user to perform various stunts and tricks in combination with the spark generating assembly 30. In a preferred embodiment, the rear swivel caster wheels are allowed to rotate without rotational limitation or biasing force, and in yet another preferred embodiment, the rear swivel caster wheels are prevented from full 360 degree rotation by a limiting stop. In another embodiment, the rear swivel caster wheel assemblies comprise a biasing member causing the rear swivel caster wheels to be biased to a neutral steering position and causing the swivel caster wheel assembly to return to its neutral steering position the external swiveling forces have been removed. Other embodiments can combine the biasing arrangement and the rotational limits described above.

Figure 4:
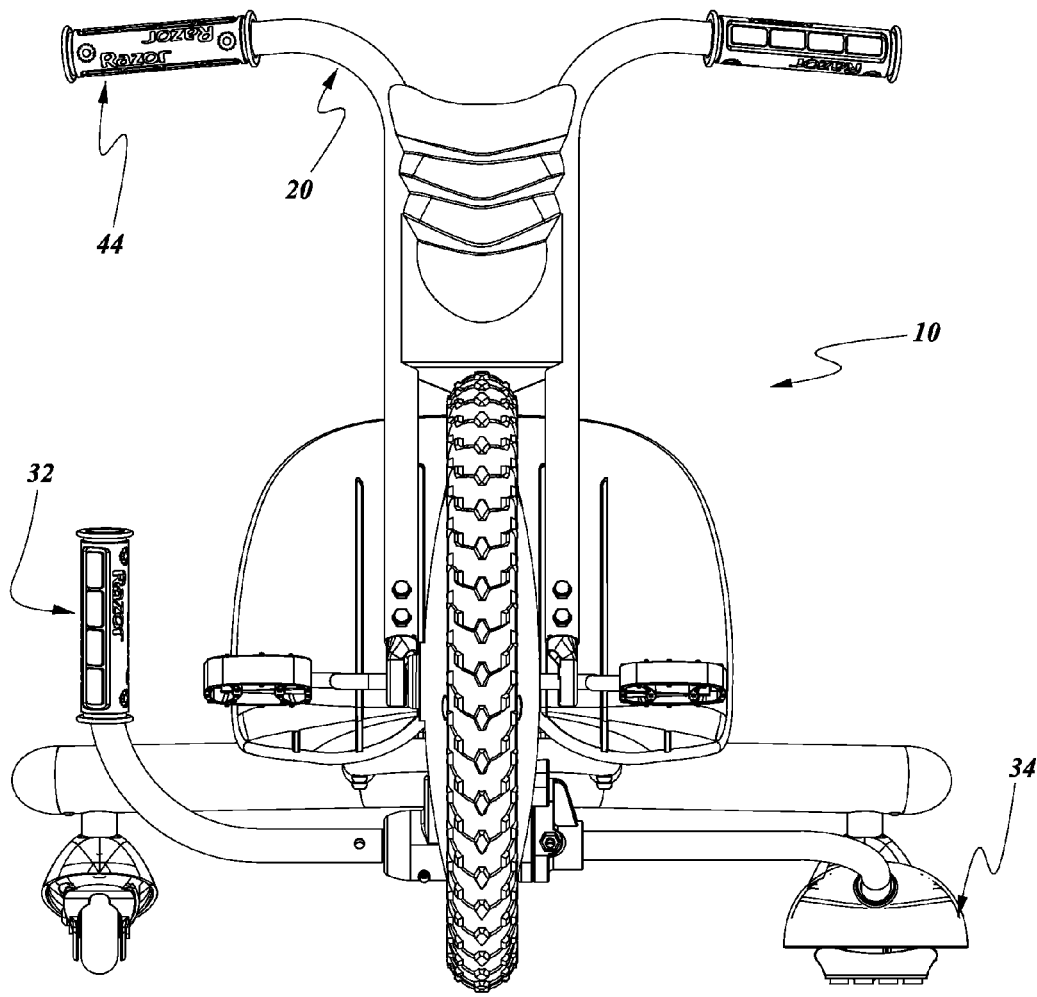
FIG. 4 is a front view of the tricycle and spark generating device of FIG. 1.

FIG. 4 shows a preferred embodiment of the tricycle as viewed from the front perspective. In the depicted embodiment, the handle actuation portion 32 and the spark portion 34 are integrally connected to comprise the spark generating assembly 30, although in some embodiments the handle actuation portion 32 and the spark portion 34 are operably connected, or operably coupled by a connecting or coupling means respectively.

In an alternate embodiment of a spark generating assembly 30 similar to the embodiment shown in FIG. 1. The handle actuation portion 32 is supported by the frame 12 at a different location from the spark generation assembly 30. For example, the handle actuation portion 32 can be rotatably supported by the rear portion 16 of the frame 10 and other portions of the spark generation assembly 30 can be supported by the front portion 14 or other portions of the frame 10. In such embodiments, the spark generating assembly 30 can be operably connected to both the front portion 14 and the rear portion 16 of the frame 10 with the handle actuation portion 32 being pivotably connected to the spark portion 34 by at least one pivoting means or linkage mechanism. In such embodiments, the biasing member 38 can be supported at different locations on the frame 10 and can by coupled to different portions of the spark generating assembly. In these embodiments, the spark generating assembly 30 can include a spark portion 34 with a plurality of spark elements 36.

Figure 5:
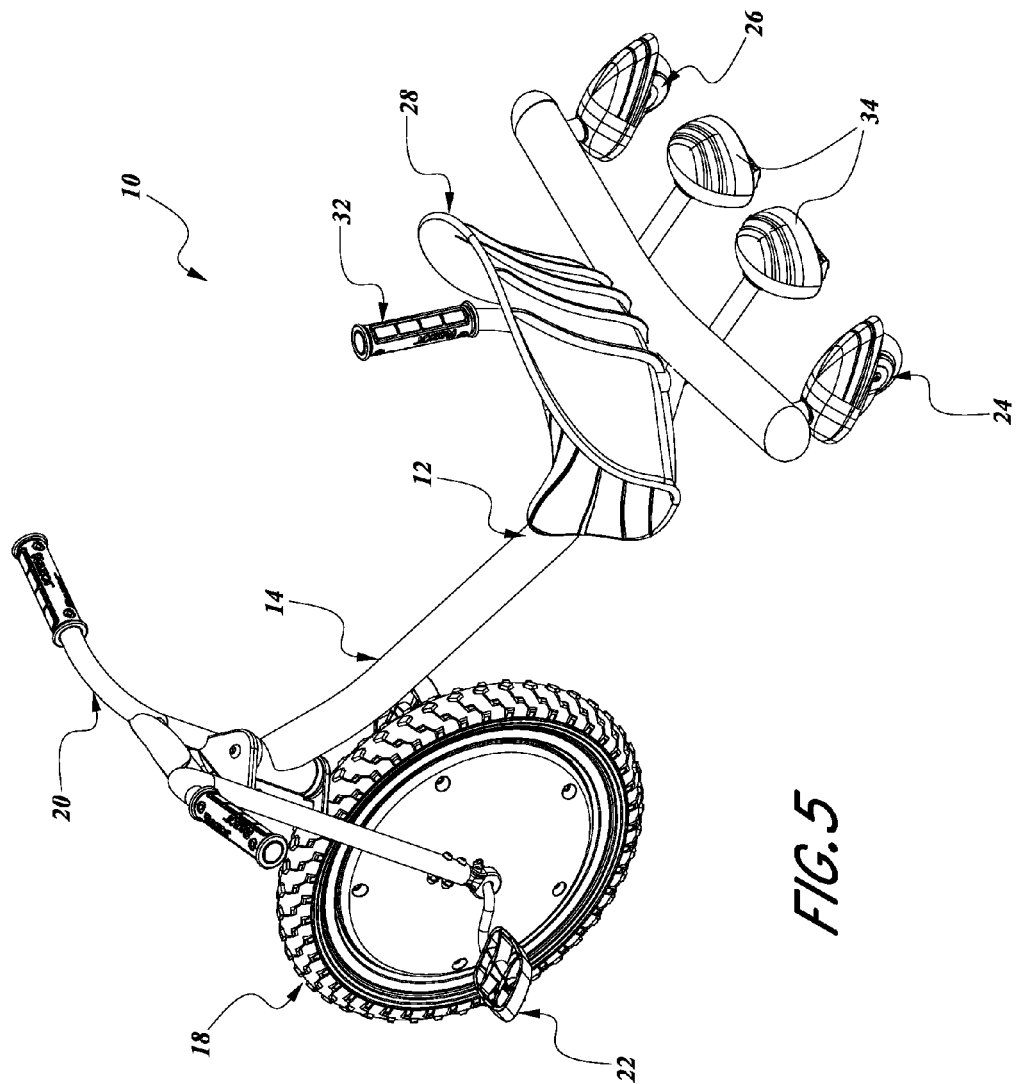
FIG. 5 is a perspective view of another embodiment of a spark generating device supported by a tricycle.

FIG. 5 illustrates another alternate embodiment, wherein the spark generating assembly 30 is rotatably supported by the frame 12 of the tricycle 10. In this embodiment, the spark generating assembly 30 is operably supported by both the front portion 14 and the rear portion 16 of the frame 10. In this embodiment, the spark portion 34 of the spark generating assembly 30 extends in a rearward direction relative to the seat 28 of the user. This allows the spark elements 36 of the spark portion 34 to contact the riding surface at a contact point to behind the seat 28 of the user. The embodiment of FIG. 5 further illustrates an embodiment of the spark generating assembly 30 having a plurality of spark portions 34, each having a plurality of spark elements 36. The illustrated spark portions 34 are arranged side by side, but the spark portions 34 can also be arranged in other positions or arrangements. In a preferred embodiment, the biasing member 38 is coupled at one end to a portion of the frame 12 and the other end is coupled to a portion of the spark generating assembly 30. In such an embodiment, the biasing member 38 could be a spring or other elastic material.

In an alternate embodiment, the spark generating assembly 30 is operably supported by the frame 12 and, preferably, at the rear portion 16 of the frame 12 of the tricycle 10. In this embodiment, the user can move the spark generating assembly 30 from the first position to the second position by acting upon the handle actuation portion 32 of the spark generating assembly 30. The user moves the spark portion 34 from the first position to the second position by pushing the handle actuation portion 32 downward toward the riding surface. An embodiment of the biasing member 38, biases the spark generating assembly toward a first position. Preferably, the spark portion 34 of the spark generating assembly 30 contacts the riding surface at a contact point forward the rear wheels 24 and 26. This allows the spark generating assembly 30 to create sparks at a contact point position such that the user is able to view the sparks being created without substantially turning his or her body or head while operating the tricycle. In addition, the spark portion 34 can be supported at a location between a pivot of the handle actuation portion 32 and a handgrip portion of the handle actuation portion 32.

Figure 6:
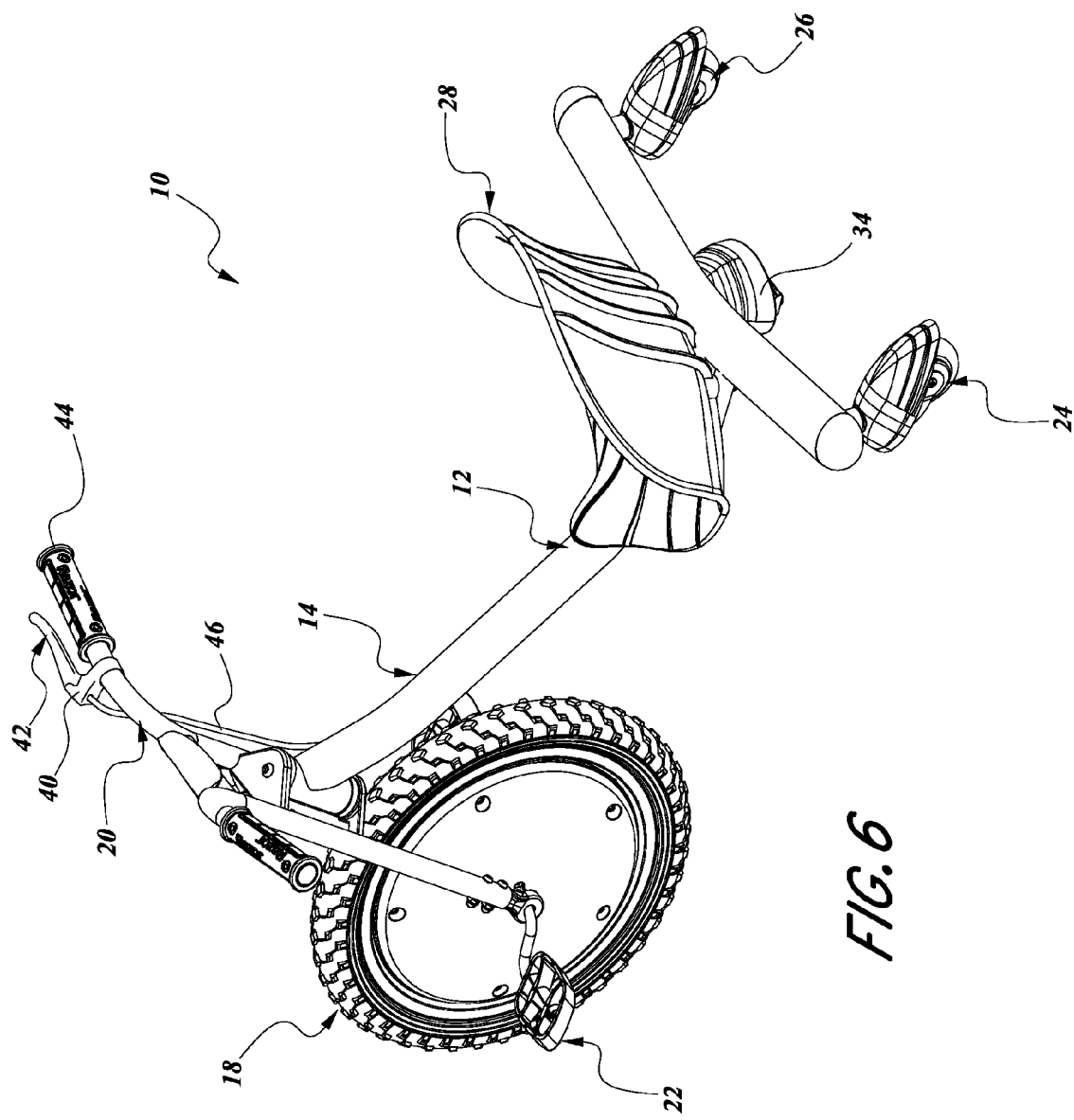
FIG. 6 is a perspective view of another embodiment of a spark generating device having an actuating lever assembly supported by a handlebar assembly of the tricycle.

FIG. 6 illustrates an alternate embodiment of a spark generating assembly. In this embodiment, an actuating lever assembly 40 is attached to the handlebar assembly 20 near a handlebar handgrip 44. The actuating lever assembly 40 comprises an actuating hand lever 42 positioned proximate the handlebar handgrip 44 and configured such that the user is able to act upon the actuating hand lever 42 without removing the user's hand substantially away from the handlebar handgrip 44. The actuating hand lever 42 has a first position and a second position, and a biasing member can be configured to cause the actuating hand lever to be biased toward the first position. The spark generating assembly 30 having a spark portion 34 is supported by the frame and biased toward a first position in which the spark portion 34 does not contact the riding surface, and the actuating lever assembly 40 is operably coupled to the spark generating assembly 30 by a cable 46. Preferably, actuation of the hand lever 42 pulls the cable and displacement of the cable causes the spark generating assembly to rotate so that the spark portion 34 contacts the riding surface.

Preferably, in the embodiment illustrated in FIG. 6, the cable 46 is operably connected to the spark generating assembly 30 such that when the user acts upon the actuating hand lever 42 to move it from the first position to a second position, a force is exerted upon the cable 46 and said force is communicated through the cable 46 to the spark generating assembly 30, causing the spark generating assembly 30 to move from the first position to a second position in which the spark elements 36 contact the riding surface. FIG. 6 illustrates the actuating lever assembly 40 and the spark generating assembly 30 operably connected to the frame, the actuating lever assembly being operably coupled to the spark generating assembly by a cable 46. The embodiment illustrated in FIG. 6 is configured to utilize certain configurations similar to those known in the implementation of lever brake and cable systems used in two wheeled bicycles. This embodiment allows the user to act upon the actuation portion without removing the user's hands away from the handlebar assembly.

FIG. 6 illustrates an embodiment in which the actuating lever assembly 40 is positioned proximate the right handlebar handgrip 44 of the handlebar assembly 20. In another preferred embodiment of the invention, the actuating lever assembly is positioned proximate the left handlebar handgrip of the handlebar assembly. In another preferred embodiment of the invention, the handlebar assembly supports a first actuating lever assembly positioned proximate the right handlebar handgrip and a second actuating lever assembly positioned proximate the left handlebar handgrip, the first and second actuating lever assemblies operably coupled to a plurality of spark generating assemblies by cables. In another embodiment, a rotatable throttle grip assembly may be provided to actuate the spark generating assembly 30. Any of the above-described hand-operated actuators may be used in combination with any embodiment of the spark generating assembly 30 described above.

In another embodiment, the tricycle may further comprise an electric motor and battery housing, the battery housing comprising a controller and at least one battery, said electric motor configured to provide battery powered rotational power to the at least one front wheel. In this embodiment, the electric motor may be mounted on the front fork near the at least one front wheel. The tricycle may comprise a driven sprocket mounted to the axle of the front wheel and operably coupled to a drive sprocket attached to a drive shaft of the electric motor by a driven chain, or other means such as a belt. An alternate configuration may comprise a powered roller attached to the drive shaft of the electric motor, configured to provide frictional rotational force upon the outer circumference of the at least one front wheel. Any of the above-described hand-operated actuators may be used in combination with any embodiment of the spark generating assembly 30 described above.

Although the invention presented herein has been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular embodiments described above, but should be determined only by a fair reading of the claims that follow.

What is claimed is:

1. A tricycle comprising:
a frame having a front portion and rear portion;
a handlebar assembly rotatably connected to the front portion of the frame;
a front wheel coupled to the handlebar assembly;
foot pedals operably connected to the front wheel;
a seat supported by the frame;
rear wheels supported by the rear portion of the frame;
a spark generating assembly comprising:
  a handle actuation portion that is accessible to a hand of a user;
  a spark portion that is movable in response to movement of the handle actuation portion, the spark portion including at least one spark element that generates sparks when in frictional contact with a surface; and
  an elongate portion extending between the handle actuation portion and the spark portion;
a housing portion coupled to the frame and configured to support the spark generating assembly such that at least a portion of the spark generating assembly is rotatable relative to the frame, a portion of the elongate portion extending through the housing portion;
wherein the spark portion has a first position in which the spark portion is not in contact with a surface and a second position in which the spark portion is in contact with a surface;

wherein the spark portion is biased toward the first position by a biasing member;

wherein the spark portion is movable to the second position in response to the user acting upon the handle actuation portion.

2. The tricycle of claim 1, wherein the housing portion is coupled to the frame at a location beneath the seat and a portion of the elongate portion extends horizontally through the housing portion.

3. The tricycle of claim 1, wherein the handle actuation portion extends upward from a location lower than the seat to a location higher than at least a portion of the seat.

4. The tricycle of claim 1, wherein the handle actuation portion and the spark portion are on opposite sides of the seat, and the elongate portion is a unitary piece that connects the spark portion and the handle actuation portion.

5. The tricycle of claim 1, wherein the rear wheels are configured to swivel relative to the frame.

6. The tricycle of claim 1, wherein the housing portion defines an axis about which the entire spark generating assembly rotates, and the spark portion moves downward as the actuation portion moves upward or backward.

7. The tricycle of claim 1, wherein the spark element contacts the riding surface at a location forward of the rear wheels and to the side of the seat when the spark portion is in the second position.

8. A vehicle comprising:
a frame having a front portion and a rear portion, the frame supporting a seat;
a handlebar assembly rotatably connected to the frame;
a first side and a second side defined by a center line, the center line extending between the front portion and the rear portion and through the center of the vehicle;
at least one front wheel operatively coupled to the handlebar assembly;
a spark generating assembly comprising:
an elongate portion rotatably supported by the frame, at least part of the elongate portion extending substantially perpendicular to the centerline and substantially parallel to the riding surface;
a handle actuation portion supported by the elongate portion and accessible to the hand of a user;
a spark portion supported by the elongate portion that generates sparks when in frictional contact with a surface;
wherein the spark portion has an engaged position in which the spark portion is in contact with a surface;
wherein the spark portion is movable to the engaged position in response to the user acting upon the handle actuation portion;
wherein the spark portion and the handle actuation portion are located on opposite sides of the center line.

9. The vehicle of claim 8, wherein the elongate portion is rotatably coupled to the frame at a location beneath the seat and a housing portion is coupled to the frame and supports the elongate portion, a portion of the elongate portion extending through the housing portion.

10. The vehicle of claim 8, wherein the handle actuation portion extends upward from a location lower than the seat, to a location higher than at least a portion of the seat.

11. The vehicle of claim 8, wherein the handle actuation portion is located adjacent to the seat and to the side of the seat, and the spark portion is located on the opposite side of the frame and to the opposite side of the seat.

12. The vehicle of claim 8, wherein the spark portion includes a plurality of spark elements configured to generate sparks when in frictional contact with a surface.

13. A spark generating device for a vehicle, the vehicle having a frame supporting a seat and a handlebar assembly, the spark generating device comprising:
a handle actuation member that is accessible to the hand of a user;
a spark portion having a spark element that generates sparks when in contact with a riding surface, the spark portion being lower than the handle actuation member and closer to the riding surface; and
an intermediate portion configured to be rotatably supported by a vehicle frame, the intermediate portion having a first end and a second end, the first end supporting the handle actuation member and the second end supporting the spark portion;
wherein the intermediate portion includes an axis about which the intermediate portion, handle actuation member, and spark portion rotate;
wherein the spark portion has a first position in which the spark element is not in contact with the riding surface and a second position in which the spark element is in contact with the riding surface;
wherein the spark portion is biased toward the first position by a biasing member;
wherein the spark portion is movable to the second position in response to the user acting upon the handle actuation portion.

14. The spark generating device of claim 13, wherein the intermediate portion is rotatably supported beneath the vehicle and the intermediate portion is a single unitary piece.

15. The spark generating device of claim 13, wherein upward or backward movement of the handle actuation portion causes the spark portion to move downward, and rotation of the handle actuation portion about the axis causes rotation of the spark portion about the axis.

16. The spark generating device of claim 13, wherein the handle actuation portion extends in a first direction and is coupled to a part of the intermediate portion that extends in a second direction, the first direction being substantially perpendicular to the second direction.

17. The spark generating device of claim 13, wherein the spark portion includes a plurality of spark elements configured to generate sparks when in frictional contact with the riding surface.

* * * * *